(12) United States Patent
Birnbach

(10) Patent No.: US 10,181,376 B2
(45) Date of Patent: Jan. 15, 2019

(54) ELECTRON-COUPLED TRANSFORMER

(71) Applicant: Advanced Fusion Systems LLC, Newtown, CT (US)

(72) Inventor: Curtis A. Birnbach, New Rochelle, NY (US)

(73) Assignee: Advanced Fusion Systems LLC, Newtown, CT (US)

( * ) Notice: Subject to any disclaimer, the term of this patent is extended or adjusted under 35 U.S.C. 154(b) by 339 days.

(21) Appl. No.: 14/718,334

(22) Filed: May 21, 2015

(65) Prior Publication Data

US 2015/0255210 A1 Sep. 10, 2015

Related U.S. Application Data

(60) Continuation of application No. 13/850,763, filed on Mar. 26, 2013, which is a division of application No.
(Continued)

(51) Int. Cl.
*G21B 1/00* (2006.01)
*G21B 1/03* (2006.01)
(Continued)

(52) U.S. Cl.
CPC .............. *H01F 38/00* (2013.01); *G21B 1/00* (2013.01); *G21B 1/03* (2013.01); *G21B 1/23* (2013.01);
(Continued)

(58) Field of Classification Search
CPC .. H01F 38/00; G21B 1/00; G21B 1/03; G21B 1/23; G21B 3/008; G21D 7/00; H05G 2/001; Y02E 30/14
(Continued)

(56) References Cited

U.S. PATENT DOCUMENTS 3,356,287 A 12/1967 Winters
3,407,991 A 10/1968 Bills et al.
(Continued)

FOREIGN PATENT DOCUMENTS

EP 0134167 A2 3/1985
EP 0244769 A2 11/1987
(Continued)

OTHER PUBLICATIONS

Official Action for Mexico Application No. MX/a/2012/011123 dated Jun. 2013.
(Continued)

*Primary Examiner* — Frank J McGue
(74) *Attorney, Agent, or Firm* — Bruzga Patent Law Firm; Charles E. Bruzgha; Shlomo S. Moshen

(57) ABSTRACT

An Electron-coupled transformer for generating a high voltage output pulse as an amplified version of an input pulse includes a cylindrical triode electron tube with a central anode along main axis and a grid and cathode radially spaced from the anode. The anode has a first end directly grounded and a second end insulated from a direction connection to ground. The cathode and the grid form a traveling wave electron gun that produces, when the grid is grounded through a phase matching network, a radially symmetrical collapsing traveling wave of ground potential in the Transverse Electromagnetic mode. The foregoing wave of ground potential causes a beam of electrons to flow from the cathode to the anode and causes a voltage output pulse to be produced on the second end of the anode, whose magnitude is an amplified version of the input pulse that is injected into the cathode.

4 Claims, 12 Drawing Sheets

Related U.S. Application Data

11/754,928, filed on May 29, 2007, now Pat. No. 9,036,765.

(60) Provisional application No. 60/809,453, filed on May 30, 2006.

(51) Int. Cl.
*G21B 1/23* (2006.01)
*G21D 7/00* (2006.01)
*H05G 2/00* (2006.01)
*H01F 38/00* (2006.01)

(52) U.S. Cl.
CPC ............... *G21D 7/00* (2013.01); *H05G 2/001* (2013.01); *Y02E 30/14* (2013.01)

(58) Field of Classification Search
USPC .......................................................... 376/107
See application file for complete search history.

(56) References Cited

U.S. PATENT DOCUMENTS

| | | |
|---|---|---|
| 4,723,263 A | 2/1988 | Birnbach et al. |
| 4,751,429 A | 6/1988 | Minich |
| 4,801,848 A | 1/1989 | Birnbach et al. |
| 4,950,962 A | 8/1990 | Birnbach et al. |
| 5,235,248 A | 8/1993 | Clark et al. |
| 6,188,746 B1 | 2/2001 | Miley et al. |
| 6,229,876 B1 | 5/2001 | Enck et al. |
| 6,718,012 B2 | 4/2004 | Ein-Gal |
| 2004/0245932 A1 | 12/2004 | Durand |
| 2005/0084054 A1 | 4/2005 | Franz |
| 2005/0200256 A1 | 9/2005 | Adamenko |

FOREIGN PATENT DOCUMENTS

| | | |
|---|---|---|
| EP | 0999619 A1 | 5/2000 |
| GB | 2315363 A | 1/1998 |

OTHER PUBLICATIONS

Patent Examination Report No. 1 for Australian Application No. 2013201537 dated Sep. 12, 2013.
Notice of Provisional Rejection of Korean Application No. 10-2015-7035061 dated Jan. 5, 2017.
European Search Report of European Application No. 16190435 dated May 3, 2017.

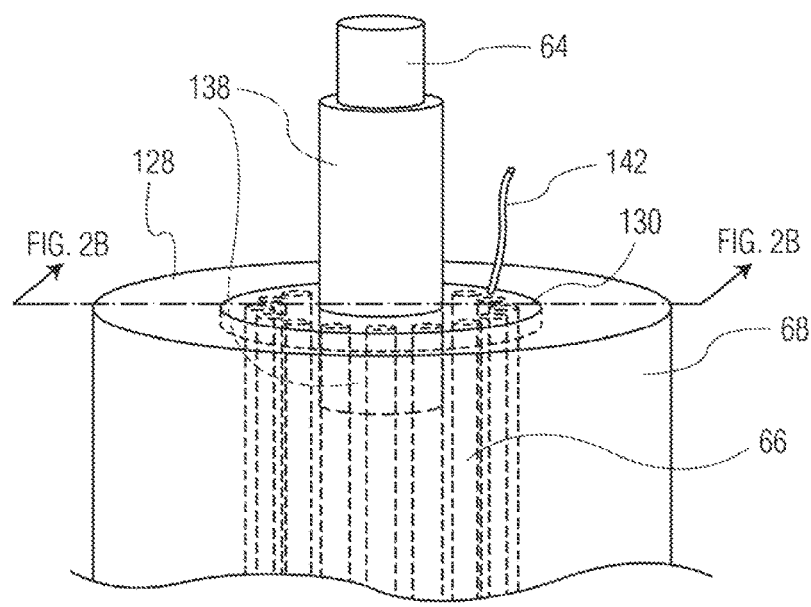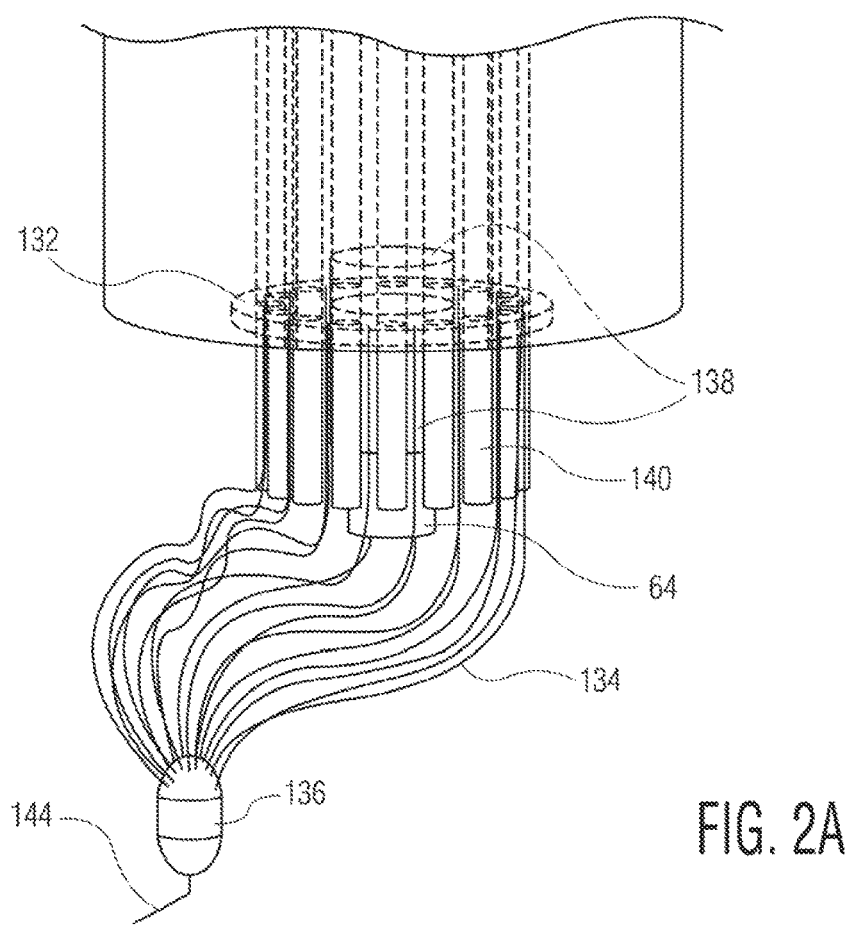
FIG. 2A

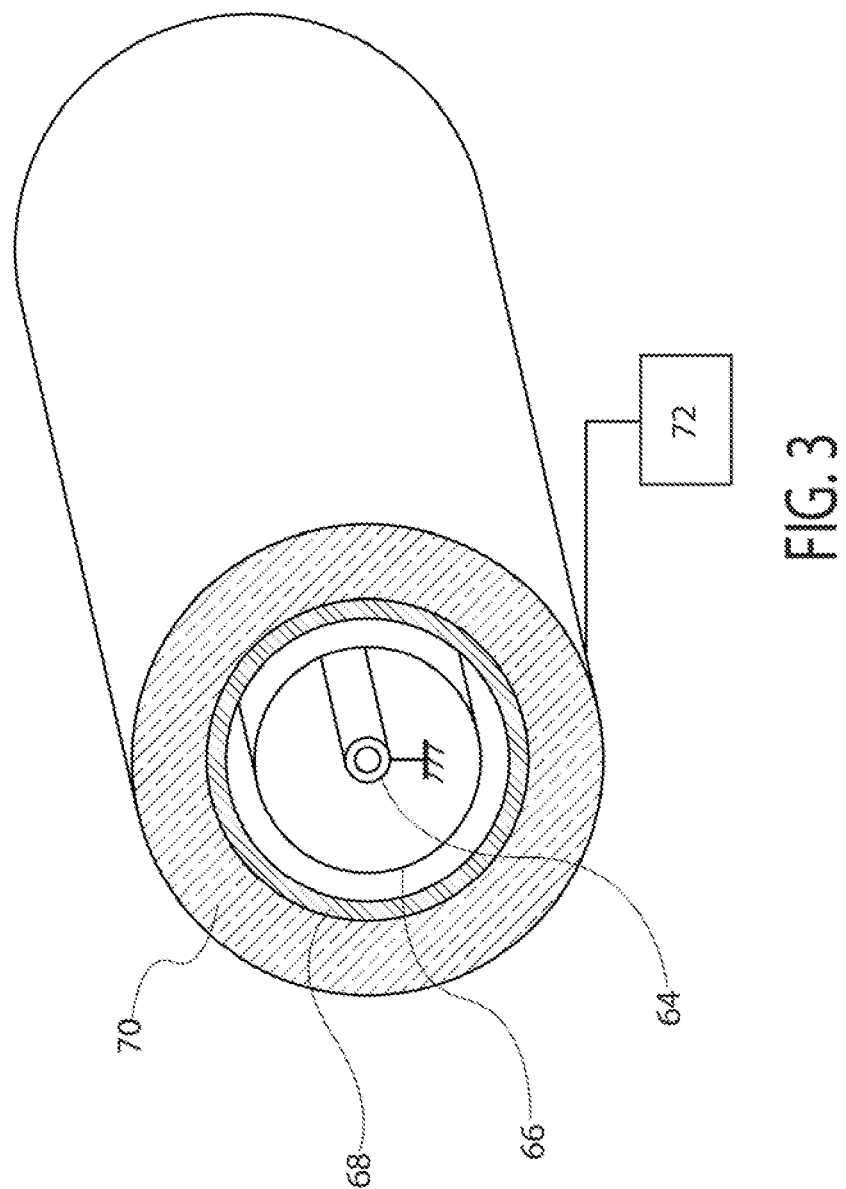

ELECTRON-COUPLED TRANSFORMER

CROSS-REFERENCE TO RELATED APPLICATIONS

This application is a continuation application claiming priority to (1) U.S. Provisional Patent Application No. 60/809,453 entitled "Method & Apparatus for Controlled Fusion Reactions" filed May 30, 2006; (2) U.S. patent application Ser. No. 11/754,928, filed May 29, 2007, for "Method and System for Inertial Confinement Fusion Reactions," now U.S. Pat. No. 9,036,765 B2; and (3) U.S. patent application Ser. No. 13/850,763, filed Mar. 26, 2013, for "Electron-Coupled Transformer," which is a divisional of application Ser. No. 11/754,928. The foregoing applications are incorporated herein by reference in their entirety.

FIELD OF THE INVENTION

The present invention relates to electron-coupled transformers for providing a voltage output.

BACKGROUND OF THE INVENTION

Transformers for providing a voltage output are known. For example, high speed transformers such as a Magnetic Linear Adder Transformer include a secondary, for example, a "stalk," with one end attached to ground and the other end being the high voltage output terminal. A series of Toroidal primaries are stacked on the stalk. Each primary pulse adds to the energy (voltage) in the secondary.

A disadvantage of the Magnetic Linear Adder Transformer is that Toroidal-shaped primaries will go into saturation and collapse the field if they are driven with too large a pulse. This limits the amount of energy that one can extract from this type of transformer. A further disadvantage is a resulting pulse having a "staircase" leading edge, rather than a smooth leading edge.

Therefore, it would be desirable to provide a transformer for creating a high voltage pulse that avoids the foregoing problems of saturation and the leading edge of a pulse having a "staircase" pattern.

According, the invention provides an electron-coupled transformer for generating a high voltage output pulse as an amplified version of an input pulse. The electron-coupled transformer comprises a cylindrical coaxial triode electron tube with a central anode along the main axis of the tube and a cylindrical grid and a cylindrical cold cathode which are radially and coaxially spaced from the anode. The grid-cathode spacing is constant across the length of the grid. The grid is configured to have a constant and uniform electric field in the grid-cathode region. All edges of the grid have a radius equal to half the thickness of the associated material of the grid, and the grid lacks sharp edges or burs. The anode has an input end directly grounded and an output end insulated from a direct connection to ground. The cylindrical cold cathode is receptive of said input pulse via a cathode feedthrough and forms a primary of the transformer and the output end of the anode forms a secondary of the transformer. The cylindrical cold cathode and the cylindrical grid form a traveling wave electron gun with a circular waveguide structure; the traveling wave electron gun produces, when an input end of the grid is grounded through a phase matching network, a radially symmetrical collapsing traveling wave of ground potential in the Transverse Electromagnetic mode. The foregoing traveling wave of ground potential propagates along the length of the traveling wave electron gun in a direction from the input end of the anode to the output end of the anode. The foregoing traveling wave of ground potential causes a beam of electrons to flow from the cylindrical cold cathode to the anode and causes a voltage output pulse to be produced on the output end of the anode, whose magnitude is an amplified version of said input pulse that is injected into the cylindrical cold cathode. The cylindrical cold cathode and the grid are configured so that the distributed interelectrode capacitance formed by the cylindrical cold cathode and the grid stores energy. Such energy is supplied by the input pulse. At least such energy pumps the Electron-coupled transformer.

The foregoing electron-coupled transformer beneficially avoids the saturation and "staircase" leading pulse edge problems associated with Magnetic Linear Adder Transformers mentioned above.

Other advantages and features of the invention will become apparent from reading the detailed description in conjunction with the drawing figures.

DESCRIPTION OF THE DRAWINGS

FIG. 2A is a perspective view of Grid and Phase Matching Network used with the SXE of FIGS. 1A and 1B.

FIG. 3 is a perspective view of a capacitor-enhanced version of the SXE of FIG. 1.

DETAILED DESCRIPTION OF THE INVENTION

The examples and drawings provided in the detailed description are merely exemplary, and should not be used to limit the scope of the claims in any claim construction or interpretation.

A list of drawing reference numbers, their associated parts and preferred materials for the parts can be found near the end of this description of the preferred embodiments.

Figure 1A:
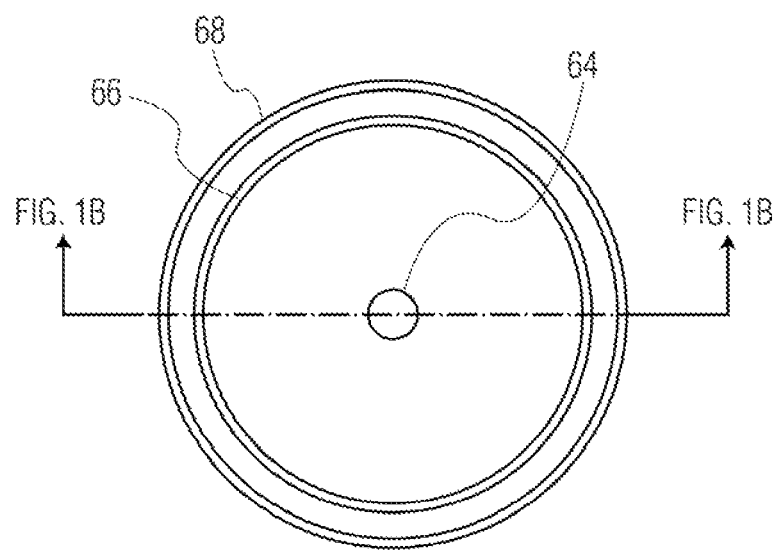
FIGS. 1A and 1B are simplified end and side cross-sections, respectively, of a basic Stimulated X-ray Emitter (SXE) Energy Driver, from which an electron-coupled transformer is derived.
Figure 1B:
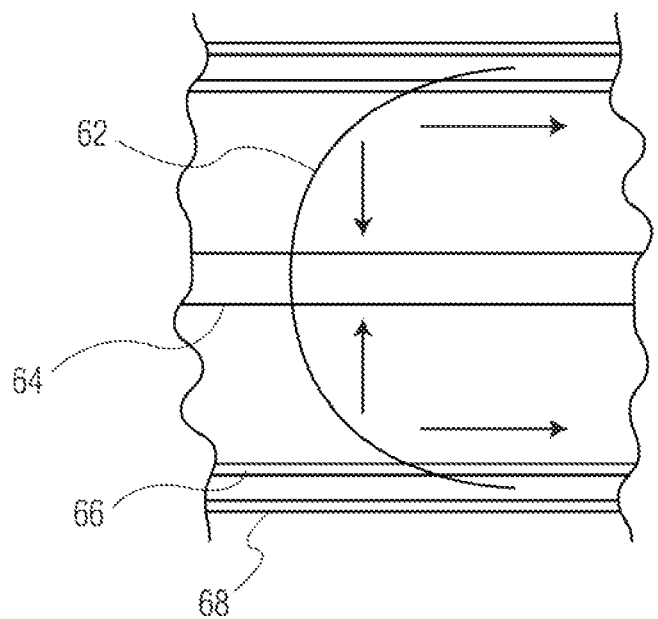

FIGS. 1A and 1B are cross-sections of a basic SXE Energy Driver, as first described by the inventor of this current invention in U.S. Pat. No. 4,723,263. FIG. 1A is an end view and FIG. 18B is a side view. Visible in these views are an anode 64, a grid 66, and a cathode 68. The SXE is a triode electron tube. It has a novel electron gun structure, comprised of the cathode 68 and the grid 66. The physical juxtaposition of these elements is such that it forms a circular waveguide. A circular waveguide supports the Transverse Electromagnetic (TEM) mode which always propagates at the Speed of Light ("c") in a vacuum. This property is critical to the function of the SXE in that it ensures that the electron beam, as shown by arrows, sweeps the anode at the speed of light and that the phase velocity and the group velocity of the TEM mode wavefront are matched. This TEM mode wavefront is known as the Collapsing Traveling Wave. This is important in the x-ray formation process in that it ensures that the x-rays formed by the beam are always traveling in a highly ionized zone and are therefore not absorbed by self-absorption processes.

The interrelation between an SXE and the claimed Electron-coupled Transformer (ECT) is as follows. The ECT is a pulse amplification device, with the pulse being an amplified version of an input pulse. An ECT is a novel electron tube derivative of the foregoing-mentioned SXE. A high voltage pulse can be generated if a first end of the SXE is directly grounded and a second end is insulated from a direct connection to ground. When an Input pulse is Injected into the cathode, an output pulse appears at the anode output. When being used for generating stimulated X-ray emission, the anode of the SXE is hollow and filled with a lasing material. If stimulated X-ray emission is not desired, the anode can be solid. However, the SXE can simultaneously exhibit stimulated X-ray emission and exhibit the ECT principle of generating a high voltage pulse, by directly grounding a first end of the SXE and insulating the second end from a direct connection to ground.

The grid structure (discussed in detail in FIG. 2) is highly symmetrical. This ensures that the collapse of the wave towards the anode is perfectly symmetrical.

Figure 2B:
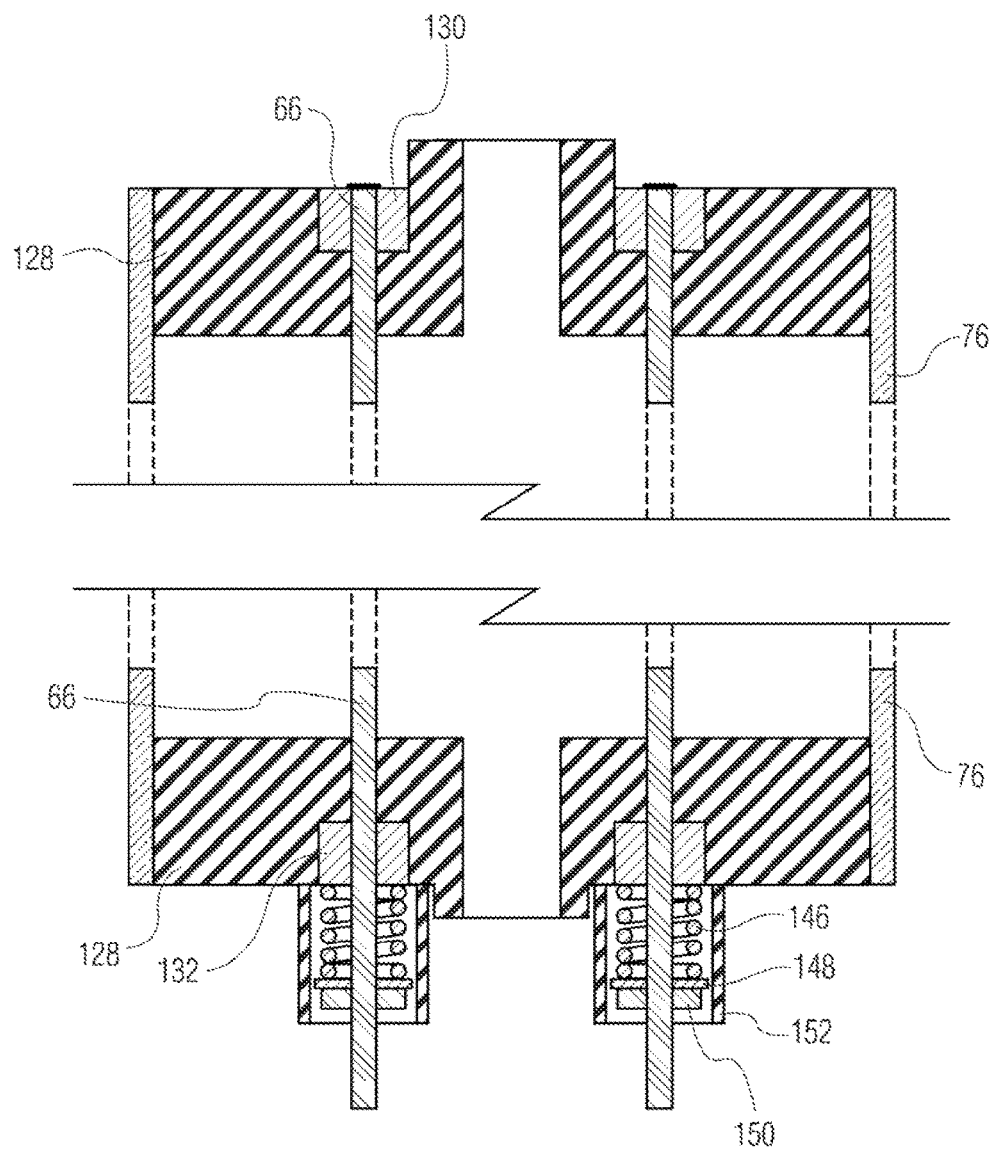
FIG. 2B is a view of the Grid and Phase Matching Network of FIG. 2A showing the cross section indicated as "FIG. 2A-2B" in that figure.
Figure 2C:
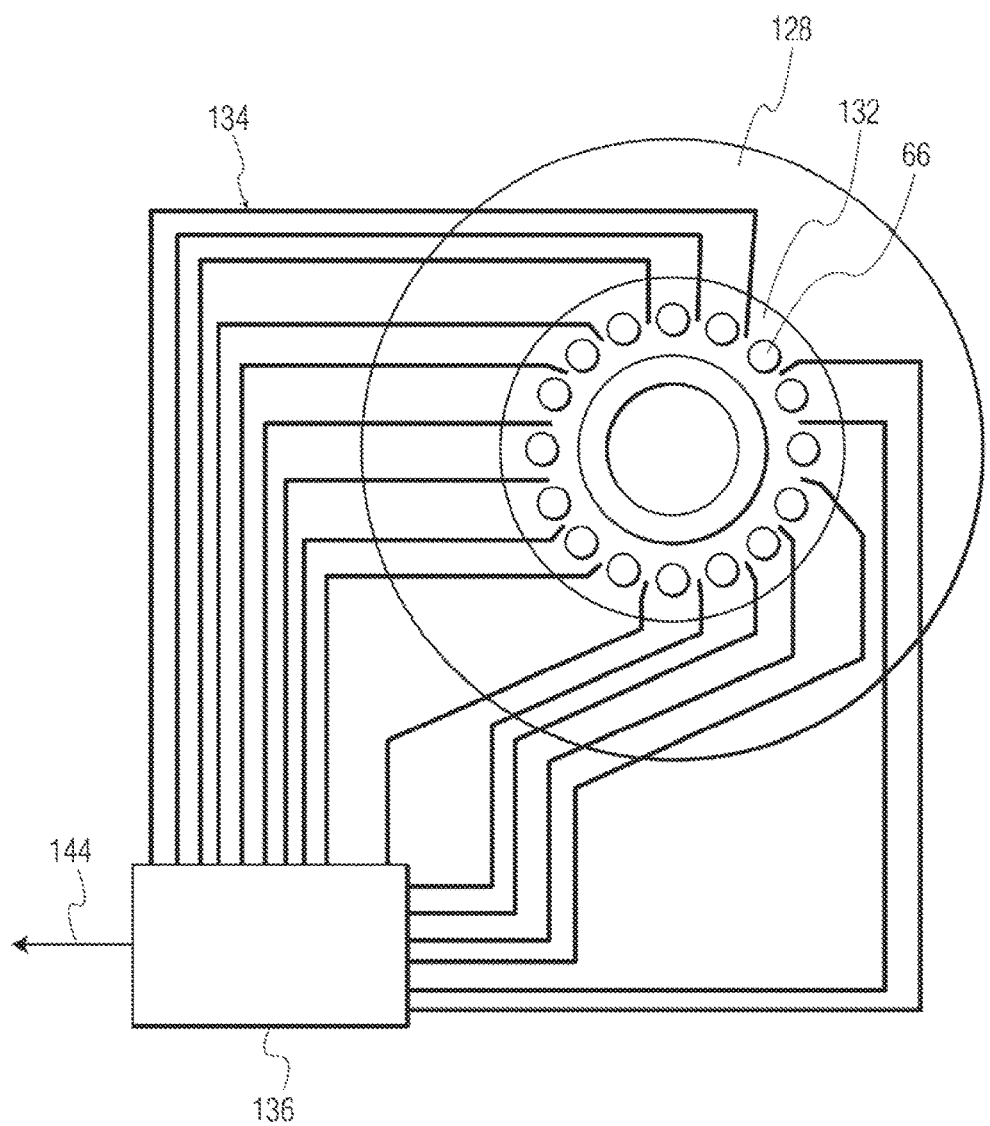
FIG. 2C is a schematic diagram of the Phase Matching Network of FIG. 2A.

Referring now to FIGS. 2A, 2B and 2C, these figures show details of the Grid and Phase Matching Network of the SXE of FIGS. 1A and 1B. FIG. 2A shows the entire Grid-Phase Matching Network and details of the Grid Insulation. These two elements are actually part of a single structure. FIG. 2B shows details of a preferred Grid Tensioning and insulating means. FIG. 2C shows the electrical schematic of the Phase Matching Network. Common to all tubes with Traveling Wave Electron Guns (TWEG) are the design requirements for the grid. No matter what scale or power level the tube is designed for, the following characteristics are common and must be present in order for the Traveling Wave Electron Gun to operate.

The Traveling Wave Electron Gun (TWEG) is a unique structure in that it uses the close juxtaposition of the grid 66 and the cathode 68 to produce a Circular Waveguide structure that supports a Transverse Electromagnetic (TEM) mode. The Transverse Electromagnetic mode in a Circular waveguide always travels at the speed of light ("c") in a vacuum. This aspect of the TWEG accounts for its extremely fast risetime (one nanosecond for each foot or 30.48 cm of gun length).

The grid is also used to both produce the electric field necessary to extract electrons from the cathode and to control the flow of such electrons. This is accomplished by selectively biasing the grid relative to the cathode. Both switching and modulation functions can be attained by appropriate biasing of the tube.

There are several critical conditions that must be met when designing a grid for a TWEG structure. They are:
(1) The grid-cathode spacing must be constant across the length of the grid. This is usually accomplished by placing the grid under high tension or building it with a rigid structure
(2) The number of elements in the grid must be high enough to ensure a constant and uniform electric field in the grid-cathode region.
(3) There must be no sharp edges or burs anywhere on the grid structure. Individual elements can be round, flat or high aspect-ratio elliptical shapes. All edges must be fully radiused. In this context, fully radiused means that the edge in question has a radius equal to half the thickness of the material; an example of fully radiused appears at 125 in FIG. 10.

The actual implementation of these design rules is determined by the size of the grid being built. The grid can be made from a single piece or, more commonly, a series of individual elements constrained by mounting rings on either end 130, 132, provided with suitable electrical insulators 136, 140 to prevent arcing, and a means of maintaining tension on the grid structure. In the preferred embodiment shown, each grid element is provided with a tensioning means in the form of a heavy spring 146, washer 148, and nut 150. The nuts of the various grid elements are tightened with a torque wrench to ensure uniform tension on all elements.

The electrical connection to the grid is made by means of a phase matching network 134, 136 that is connected to the input end of the grid. The phase matching network consists of a series of wires 134 of exactly equal length, with a typical tolerance of +/−0.0005" (+/−12 microns). Each wire of the phase matching network is connected to the lower grid support ring 132 at a point equidistant from the two adjacent grid elements. There is a plurality of phase matching network wires symmetrically disposed around the grid support ring.

The other ends of the phase matching network wires are connected to a common connector element 136. This has a number of holes on one end equal to the number of phase matching network wires, and a single hole on the opposite end. A wire is attached to this hole and runs to the grid vacuum feedthrough. The wires are silver soldered or welded by the Tungsten-Inert Gas method (TIG) as appropriate. TIG welding is preferred but not always possible.

The purpose of this phase matching network is to ensure that the entire base of the grid responds to the control signal at the same moment with an accuracy that is preferably in the picosecond range. This results in a highly symmetrical wave propagating in the TWEG structure. When the grid is grounded through the phase matching network, a radially symmetrical collapsing traveling wave is formed and propagates along the length of the TWEG structure. This is a wave of ground potential and it has the effect of allowing energy stored in the grid-cathode gap and also energy available to the cathode to propagate to the anode resulting in conduction of this signal.

Energy Storage Enhancement of SXE

FIG. 3 shows a projected view of the SXE driver enhanced with an energy storage capacitor 70 integrated directly into its structure.

The entire inner surface of the capacitor is bonded in intimate electrical contact to the cathode. The capacitor is then wound around the SXE driver until it has a suitable diameter to provide the required capacitance to store the energy necessary for the reaction.

It should be noted that the cathode-grid interelectrode space is a capacitor by itself and stores a considerable amount of energy. A three-inch (75 mm) diameter structure stores approximately 200 picofarads per foot (30.48 cm). A two foot (61 cm) diameter device would store 1.6 nanofarads per foot (30.48 cm) if operated at 500,000 Volts and would store approximately 4 Kilojoules in the cathode-grid interelectrode space.

Electron Coupled Transformer

Figure 4:
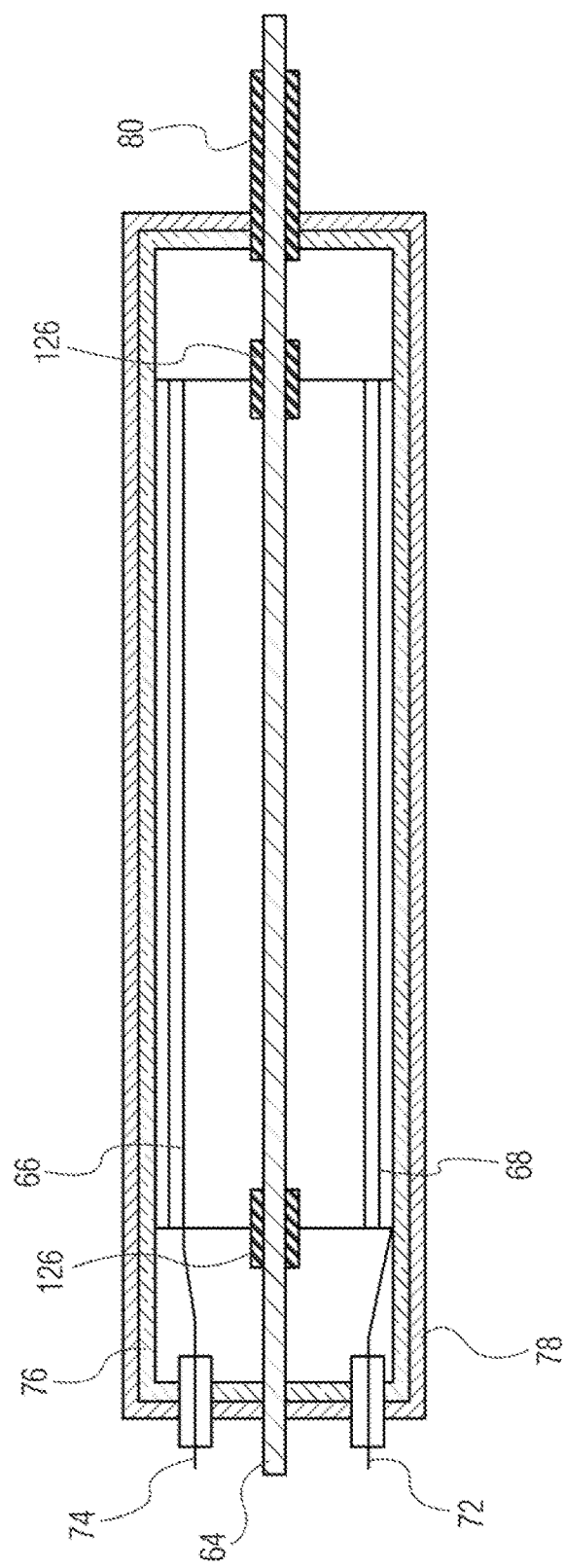
FIG. 4 is a sectional view along the length of an Electron Coupled Transformer.

FIG. 4 shows a cross-section of an Electron-coupled Transformer. The Electron Coupled Transformer (ECT) is a novel electron tube derivative of the SXE. The ECT is a pulse amplification device. It utilizes the same style electron gun as the SXE (i.e., cathode 68 and grid 66). The difference lies in the design and installation of the anode 64.

In the SXE, the anode is always hollow and filled with a lasing material. The input end (left, lower, FIG. 4) is always connected to ground. The inventor of the current invention realized that the basic SXE structure was very similar to a class of high speed transformers known as "Linear Adder Transformers". In these devices, the secondary is a "stalk" with one end attached to ground and the other end as the high voltage output terminal. A series of Toroidal primaries are stacked on the stalk. These are pulsed in sequence, such that the time between pulses is equal to the propagation time of the pulse up the stalk. Each secondary pulse adds to the energy (voltage) in the secondary.

The disadvantage of the Magnetic Linear Adder Transformer is that the Toroidal primaries will go into saturation and collapse the field if they are driven with too large a pulse. This limits the amount of energy that one can extract from this type of transformer.

The inventor of the current invention realized that there was a strong similarity between the Linear Adder Transformer and the SXE. They both incorporated a "Stalk. Both used a sequential drive mechanism, but the SXE had a much larger current-handling capacity due to the large current-handling capacity of its cold cathode. In early SXE experiments, both ends of the anode were grounded so no high voltage was observed. An experiment was conducted in late 2006 where a version of the SXE was constructed that had a first end directly grounded and a second end insulated from a direct connection to ground. A solid anode 64 (FIG. 4) was used in this test. A pulse was injected into the cathode and the anode output was measured. A final distinction between the Linear Adder Transformer and the ECT is that in the Linear Adder Transformer, the primaries are separate distinct entities. The pulse that results has a "staircase" leading edge as a result. The ECT, in its preferred embodiment, has a continuous primary (cathode) and thus has a smooth leading edge to its pulse. The ECT is much lighter than a Linear Adder due to the lack of magnetic cores. A 100 KV 100 KA ECT weighs less than 200 pounds (90.7 kilograms).

Figure 5:
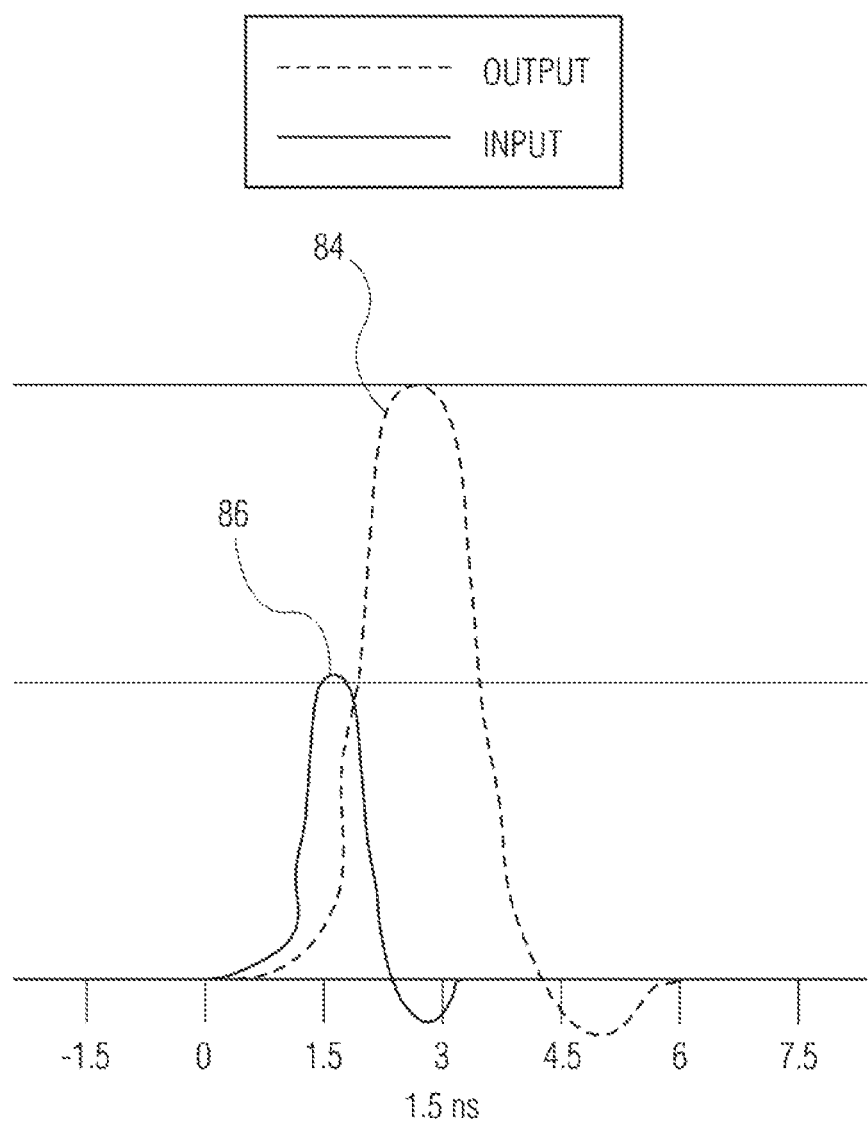
FIG. 5 shows the typical waveforms of the Electron Coupled Transformer of FIG. 4.

FIG. 5 shows the results of the foregoing test. The input pulse 86 and output pulse 84 were measured with identical voltage dividers on a high speed oscilloscope. The output pulse was several times larger than the input pulse, thus verifying the operational concept of the ECT.

Referring back to FIG. 4, we see that the ECT is nearly identical in form to the SXE (FIG. 1) but the dimensions, anode, and output are different. In the preferred embodiment, the ECT is encased in a Glass Vacuum Envelope 76. There is a robust high voltage insulator 80 at the output, which provides a constant impedance electrical connection to the outside world. The Grid and cathode signals are fed in through feedthroughs 74 and 72, respectively. As used herein, the cathode "signal" in the foregoing sentence has the same meaning as an input pulse to the cathode. The entire device is encased in a Lead radiation shield 78 to contain the transverse radiation field that forms. The thickness of shield 78 is a function of the cathode voltage and is calculated by conventional means for determining a radiation safety shield.

We note that it is both possible and practical to utilize the coaxial capacitor energy enhancement scheme described above in the "Energy Storage Enhancement of SXE" with the ECT. This would be a convenient method of making additional energy available to the ECT for extremely high power applications.

Combined SXE & RF Energy Drivers

Figure 6:
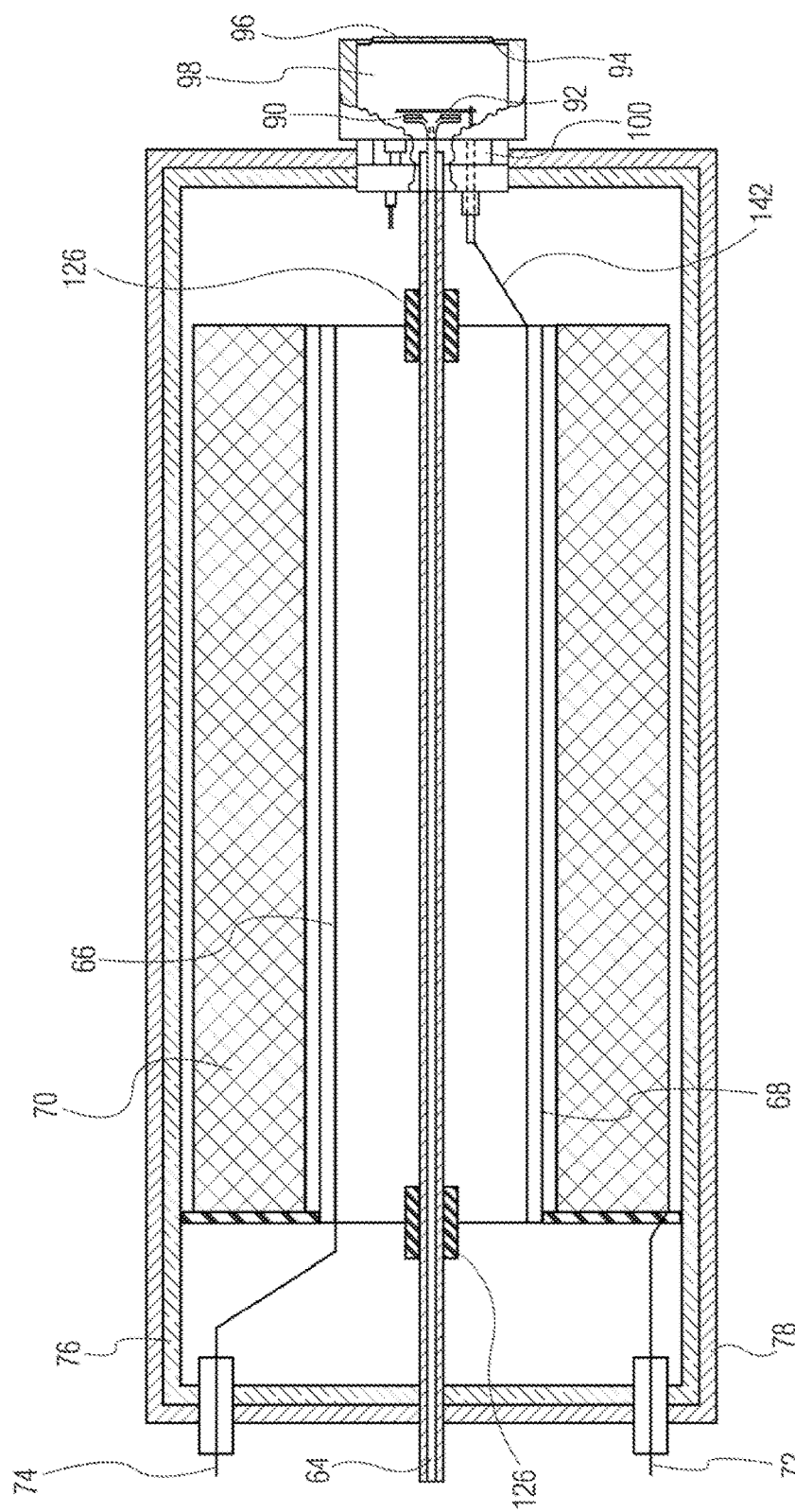
FIG. 6 is a sectional view along the length of a combined SXE-Vircator driver.
Figure 7:
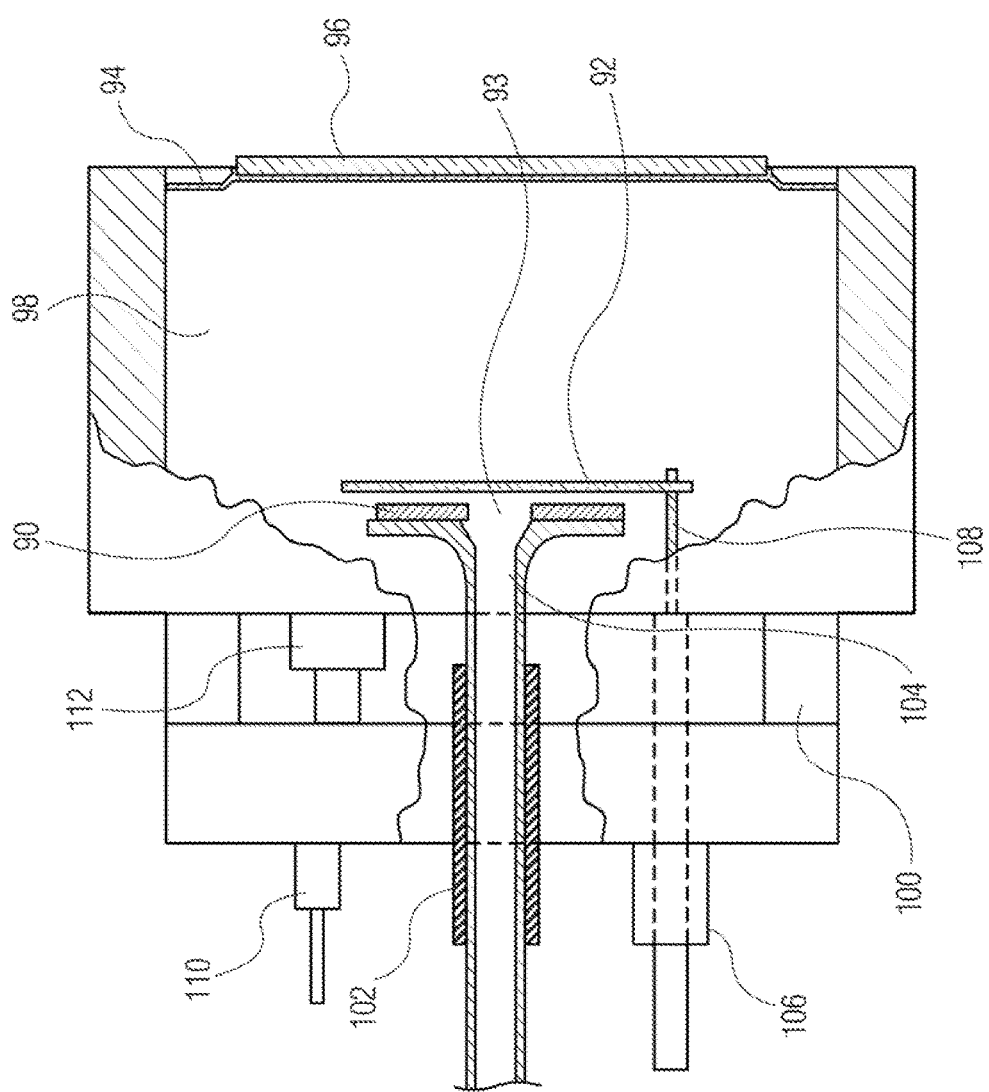
FIG. 7 is a partly sectional view along the length of the Vircator RF head of FIG. 6.

FIG. 6 shows an SXE combined with an RF generating means, and FIG. 7 shows the RF generating means. Specifically, a separate tube known generically as a Virtual Cathode Oscillator (Vircator) is mounted onto the output (right-shown) end of the SXE in FIG. 7. In this configuration, we take advantage of the Electron-Coupled Transformer (ECT) principle to use the high voltage pulse that is created by the SXE process and apply it directly to the cathode 90 of the Vircator. The Vircator body forms a resonant cavity 98 which oscillates when the cathode fires. A grid 92 controls the firing of the Vircator. The control signal is obtained from the output terminal 142 of the grid of the SXE, which is located at the opposite end from the phase matching network. The trigger pulse is applied to the Vircator sequentially as a result of the Traveling Wave action of the SXE Grid. The Cathode and grid contain an aperture in their center that the x-ray pulse propagates through.

The novelty of the foregoing system is that it combines two techniques known by themselves, i.e., Direct x-ray drive and RF Heating, so as to realize increased system efficiency. This concept is practical because the SXE is going to generate a high voltage DC pulse whether it is used or not. However, if the RF heater is not employed, then the SXE output is grounded and no high voltage DC pulse occurs. The electrical energy then leaves the system in the form of a current pulse in the ground return. But, because the HVDC pulse is available, it makes sense to use it, particularly since using it does not affect the x-ray output.

FIG. 7 shows a cross-section of the Vircator RF head. The principle components are the cathode 90, the grid 92, a mesh anode 94, a resonant cavity 98, and an output window 96. The drive pulse comes directly from the anode of the SXE 12, which is attached directly to the Vircator cathode via the cathode feedthrough 102. The Vircator is triggered by the output signal from the S×E grid 142. When the Vircator is triggered, a burst of RF energy is formed by oscillation in the resonant cavity 98. This energy has a spectral distribution that is determined by the dimensions of the cavity 98. Typically, this energy is between 200 MHz and 2.5 GHz. The energy exits the Vircator and enters the Target Chamber 10 by the output window 96. The Vircator is one type of RF source that can be integrated to the SXE 12 to increase system operating performance. The Vircator cathode 90 has an aperture 93 in its center through which the x-ray pulse from the SXE passes into the target chamber 10.

Figure 8:
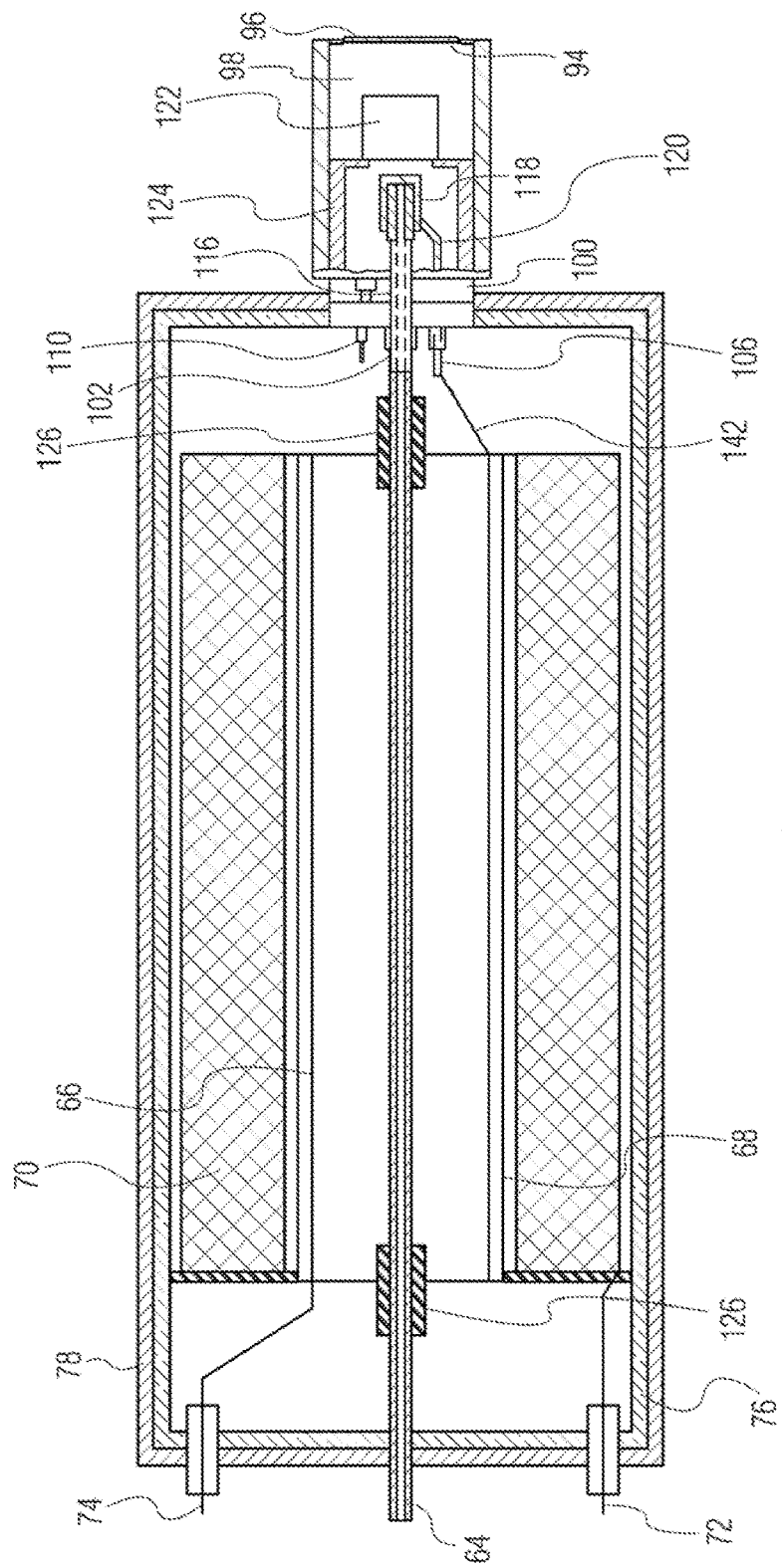
FIG. 8 is a sectional view along the length of a combined SXE-MILO driver.
Figure 9:
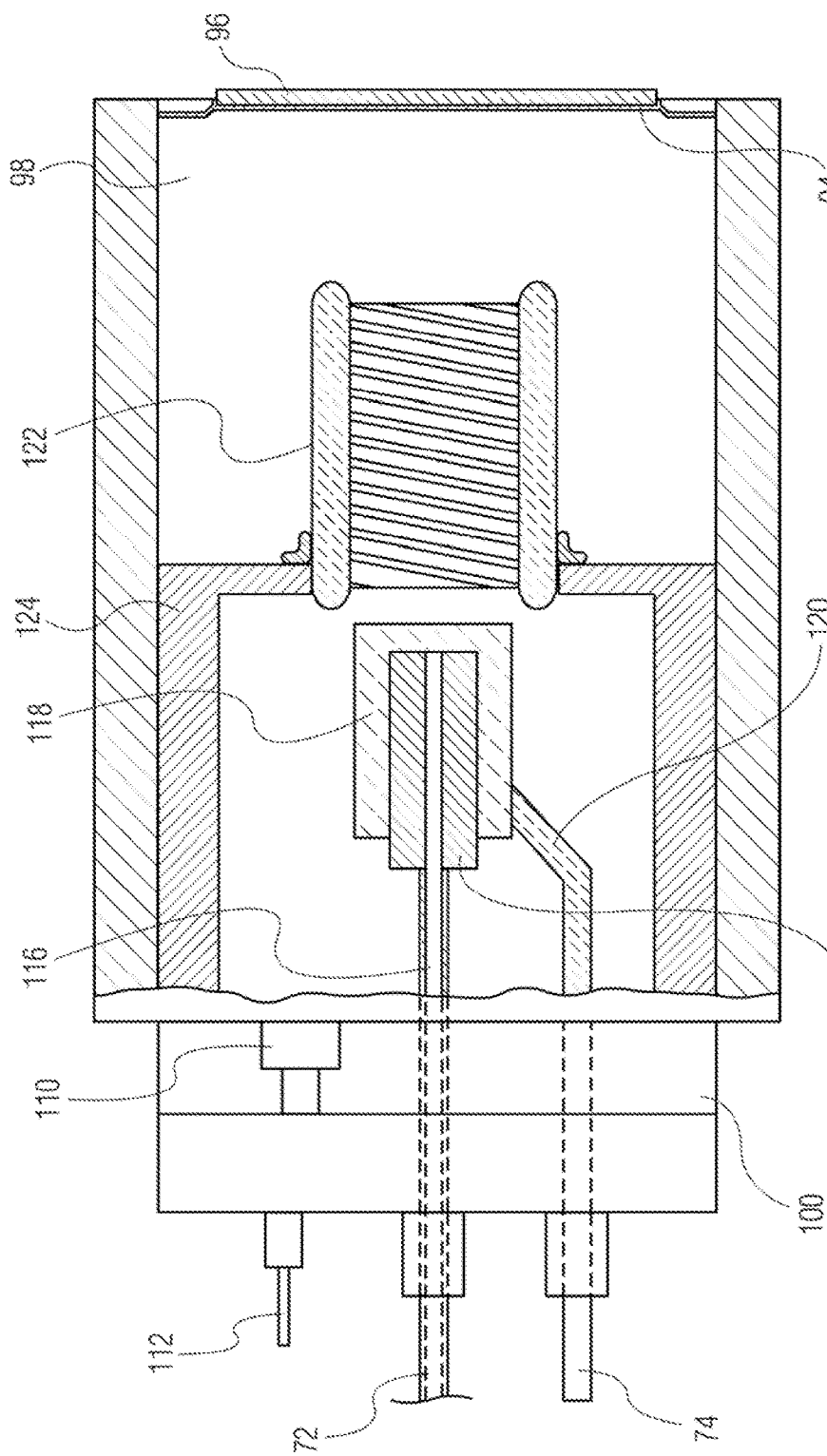
FIG. 9 is a partly sectional view along the length of the MILO RF head of FIG. 8.
Figure 10A:
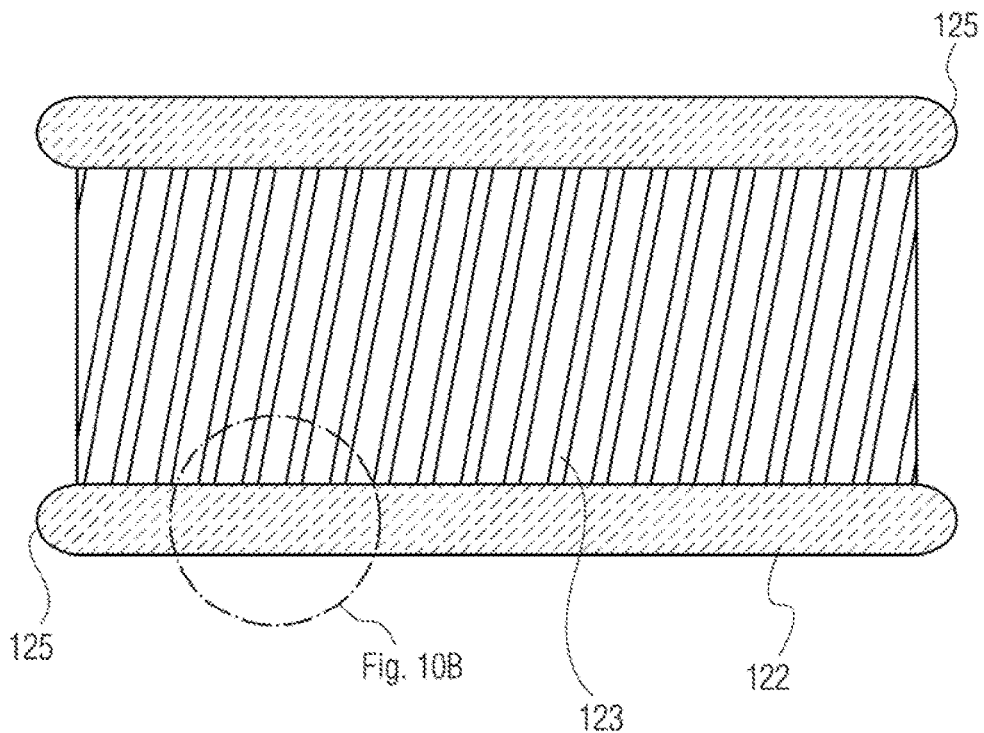
FIG. 10A is a sectional view along the length of a Drift Tube used in the MILO RF head of FIG. 8.
Figure 10B:
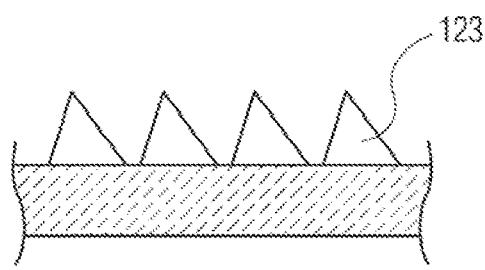
FIG. 10B is an enlarged view of the circled region in FIG. 10A entitled "FIG. 10B."

FIG. 8 shows a cross-section of an SXE combined with a Magnetically Insulated Linear Oscillator (MILO) at the output (right-shown) end of the SXE. The MILO is another well known, high power RF source, similar to the Vircator. The significant difference is that it can produce much higher frequencies than the Vircator. Structurally, the major difference is the incorporation of a drift tube 122 of FIG. 10A and use of a Traveling Wave Electron Gun (TWEG) instead of the planar cathode 90 and grid 92 of the Vircator. There is a resonant cavity 98 and its dimensions in conjunction with the dimensions of the drift tube 122 (FIG. 10A) determine the output range. Conventional MILO devices have outputs between 300 MHz and 3.5 GHz. The inventor of the present invention has experimentally verified that by placing a grating surface on the inner face of the drift tube 122 (FIG. 10A), as shown FIG. 10B, it is possible to generate RF at much higher frequencies than those available from a smooth bore drift tube 122. The source of this RF is due to the Smith-Purcell effect which describes the interaction of a relativistic electron beam with a grating surface 123. Outputs in the THz range are possible. The grating surface can be formed by many methods. The spacing, face angle and grating geometry all are determinants in the frequency achieved (FIG. 10B). It has been determined that the preferred embodiment of the drift tube grating is an internal thread as shown in FIGS. 10A and 106. By altering the thread parameters, the output frequency is changed. The ends of the Drift Tube 125 are radiused to minimize formation of undesirable electric field perturbations inside the Resonant Cavity 98.

The balance of the SXE-MILO driver is the same as the SXE-Vircator. In fact, the RF heads—Vircator and MILO—can be interchanged. As in the case of the SXE-Vircator, the TWEG of the MILO has a hollow center through which the x-rays pass. The electron output from the TWEG is compressed by the drift tube 122 and oscillates in the resonant cavity 98.

DRAWING REFERENCE NUMBERS

The following list of drawing reference numbers has three columns. The first column includes drawing reference numbers; the second column specifies the parts associated with the reference numbers; and the third column mentions a preferred material (if applicable) for the parts.

| REFERENCE NUMBER LIST | | PREFERRED MATERIAL |
| --- | --- | --- |
| 62 | Collapsing Traveling Wave | Electrons |
| 64 | Anode | Refractory Metal; Hi-Z |
| 66 | Grid | Refractory Metal |
| 68 | Cathode | Graphite (Preferred Embodiment) |
| 70 | Coaxial Capacitor | Dielectric/Metal Layers |
| 72 | Cathode Feedthrough | Ceramic & Metal |
| 74 | Grid Feedthrough | Ceramic & Metal |
| 76 | Glass Vacuum Envelope | Glass (Ceramic, Stainless Steel) |
| 78 | Radiation Shield | Lead |
| 80 | Anode Output Insulator | Ceramic |
| 84 | ECT Input Waveform | n/a |
| 86 | ECT Output Waveform | n/a |
| 90 | Vircator Cathode | Graphite |
| 92 | Vircator Grid | Refractory Metal |
| 93 | Aperture in Vircator Cathode | n/a |
| 94 | Anode Mesh | Refractory Metal |
| 96 | Output Window | RF Transparent Low-Z Ceramic |
| 98 | Resonant Circular Cavity | Stainless Steel or Copper |
| 100 | Mounting Flange | Stainless Steel |
| 102 | Cathode Feedthrough | Ceramic & Metal |
| 104 | Cathode Support | Refractory Metal |
| 106 | Grid Feedthrough | Ceramic & Metal |
| 108 | Grid Support | Refractory Metal |
| 110 | Getter Pump | n/a |
| 112 | Getter Pump Feedthrough | Ceramic & Metal |
| 114 | MILO Cathode | Graphite |
| 116 | MILO Cathode Support | Refractory Metal |
| 118 | MILO Grid | Refractory Metal |
| 120 | MILO Grid support | Refractory Metal |
| 122 | Drift Tube | Refractory Metal |
| 124 | Drift Tube Support | Ceramic |
| 125 | Radiused end of Drift Tube | Refractory Material |
| 126 | Internal Anode Insulator | Ceramic |
| 128 | Grid Insulator | Ceramic |
| 130 | Upper Grid Support Ring | Stainless Steel |
| 132 | Lower Grid Support Ring | Stainless Steel |
| 134 | Phase Matching Network Wire | Stainless Steel |
| 136 | Phase Matching Network Connector | Stainless Steel |
| 138 | Internal Anode Insulator | Ceramic |
| 140 | Phase Matching Network End Insulator | Ceramic |
| 142 | Grid Output Terminal | Refractory Metal |
| 144 | Wire to Grid Feedthrough | Ceramic & Metal |
| 146 | Grid Tension Spring | Stainless Steel |
| 148 | Washer | Stainless Steel |
| 150 | Hex Nut | Stainless Steel |
| 152 | Phase Matching Network Insulator | Ceramic |

In accordance with the invention, the foregoing describes an electron-coupled transformer that avoids the problems, inherent in Magnetic Linear Adder Transformers, of saturation and the leading edge of a pulse having a "staircase" pattern.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. An electron-coupled transformer for generating a high voltage output pulse as an amplified version of an input pulse, comprising:
   a) a cylindrical coaxial triode electron tube with a central anode along the main axis of the tube and a cylindrical grid and a cylindrical cold cathode which are radially and coaxially spaced from the anode; the grid-cathode spacing being constant across the length of the cylindrical grid; the cylindrical grid being configured to have a constant and uniform electric field in the grid-cathode region; all edges of the cylindrical grid having a radius equal to half the thickness of the associated material of the grid; and the cylindrical grid lacking sharp edges or burs; the anode having an input end directly grounded and an output end insulated from a direct connection to ground; the cylindrical cold cathode being receptive of said input pulse via a cathode feedthrough and forming a primary of the transformer and the output end of the anode forming a secondary of the transformer;
   b) the cylindrical cold cathode and the cylindrical grid forming a traveling wave electron gun with a circular waveguide structure; the traveling wave electron gun producing, when an input end of the cylindrical grid is grounded through a phase matching network, a radially symmetrical collapsing traveling wave of ground potential in the Transverse Electromagnetic mode; the foregoing traveling wave of ground potential propagating along the length of the traveling wave electron gun in a direction from the input end of the anode to the output end of the anode; whereby the foregoing traveling wave of ground potential causes a beam of electrons to flow from the cylindrical cold cathode to the anode and causes a voltage output pulse to be produced on the output end of the anode, whose magnitude is an amplified version of said input pulse that is injected into the cylindrical cold cathode; and c) the cylindrical cold cathode and the cylindrical grid being configured so that the distributed interelectrode capacitance formed by the cylindrical cold cathode and the cylindrical grid stores energy; said energy being supplied by said input pulse; at least said energy pumps the electron-coupled transformer.

2. The transformer according to claim 1, further comprising a coaxial capacitor concentrically wound on an external surface of the cylindrical cold cathode for making additional energy available to the electron-coupled transformer.

3. A combination of the electron-coupled transformer of claim 1 and a Virtual Cathode Oscillator, wherein:
   a) the cylindrical grid of the electron-coupled transformer is attached to the phase-matching network at an input end of the electron-coupled transformer; and
   b) the Virtual Cathode Oscillator is affixed to an output end of the electron-coupled transformer and comprises:
      i) a cathode that receives the high voltage output pulse from the electron-coupled transformer,
      ii) a grid for controlling the firing of the Virtual Cathode Oscillator; the foregoing grid receiving a control signal from an output end of the cylindrical grid of the electron-coupled transformer located at the output end of the electron-coupled transformer; and
      iii) the Virtual Cathode Oscillator providing a burst of RF energy when the grid thereof receives said control signal.

4. A combination of the electron-coupled transformer of claim 1 and a Magnetically Insulated Linear Oscillator, wherein:
   a) the cylindrical grid of the electron-coupled transformer is attached to the phase-matching network at an input end of the electron-coupled transformer; and
   b) the Magnetically Insulated Linear Oscillator is affixed to an output end of the electron-coupled transformer and comprises:
      i) a cathode that receives the high voltage output pulse from the electron-coupled transformer;
      ii) a grid for controlling the firing of the Magnetically Insulated Linear Oscillator; the foregoing grid receiving a control signal from an output end of the cylindrical grid of the electron-coupled transformer located at the output end of the electron-coupled transformer; and
      iii) the Magnetically Insulated linear Oscillator providing RF energy when the grid thereof receives a control signal.

* * * * *